United States Patent
Kodaka et al.

(10) Patent No.: US 8,694,580 B2
(45) Date of Patent: Apr. 8, 2014

(54) INFORMATION PROCESSING APPARATUS, SERVER SELECTING METHOD AND RECORDING MEDIUM

(75) Inventors: Toshihiro Kodaka, Yokohama (JP); Tomohiro Ohtake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 18 days.

(21) Appl. No.: 13/470,428

(22) Filed: May 14, 2012

(65) Prior Publication Data

US 2013/0013668 A1 Jan. 10, 2013

(30) Foreign Application Priority Data

Jul. 4, 2011 (JP) .................................. 2011-147923

(51) Int. Cl.
*G06F 15/16* (2006.01)
(52) U.S. Cl.
USPC ............................ 709/203; 709/219; 709/204
(58) Field of Classification Search
USPC ........................... 709/203, 201, 202, 219, 204
See application file for complete search history.

(56) References Cited

U.S. PATENT DOCUMENTS

| | | | |
|---|---|---|---|
| 7,356,592 B2 | 4/2008 | Wolf et al. | |
| 8,150,970 B1 * | 4/2012 | Whillock et al. | 709/226 |
| 2003/0014480 A1 * | 1/2003 | Pullara et al. | 709/203 |
| 2003/0063611 A1 * | 4/2003 | Schaub et al. | 370/395.32 |
| 2004/0117438 A1 * | 6/2004 | Considine et al. | 709/203 |
| 2004/0133634 A1 * | 7/2004 | Luke et al. | 709/203 |
| 2010/0077468 A1 * | 3/2010 | Pragides et al. | 726/7 |
| 2012/0155266 A1 * | 6/2012 | Patel et al. | 370/235 |
| 2012/0203866 A1 * | 8/2012 | Yoo et al. | 709/219 |
| 2012/0254300 A1 * | 10/2012 | Rai et al. | 709/203 |

FOREIGN PATENT DOCUMENTS

| | | |
|---|---|---|
| JP | 2000-207331 | 7/2000 |
| JP | 2005-516293 | 6/2005 |
| JP | 2010-79523 | 4/2010 |
| WO | WO03/063447 | 7/2003 |
| WO | WO03/063447 A1 | 7/2003 |

\* cited by examiner

*Primary Examiner* — Kostas Katsikis
(74) *Attorney, Agent, or Firm* — Fujitsu Patent Center

(57) ABSTRACT

A selection algorithm corresponding to process identification information specified by a process request from a client is chosen based on a stored correspondence relationship between process identification information indicating a requested process and the selection algorithm to select a server from among a plurality of servers. Then, a server to execute a process requested by the process request is selected from among the plurality of servers based on the decided selection algorithm, and the process request is transmitted to the selected server.

6 Claims, 18 Drawing Sheets

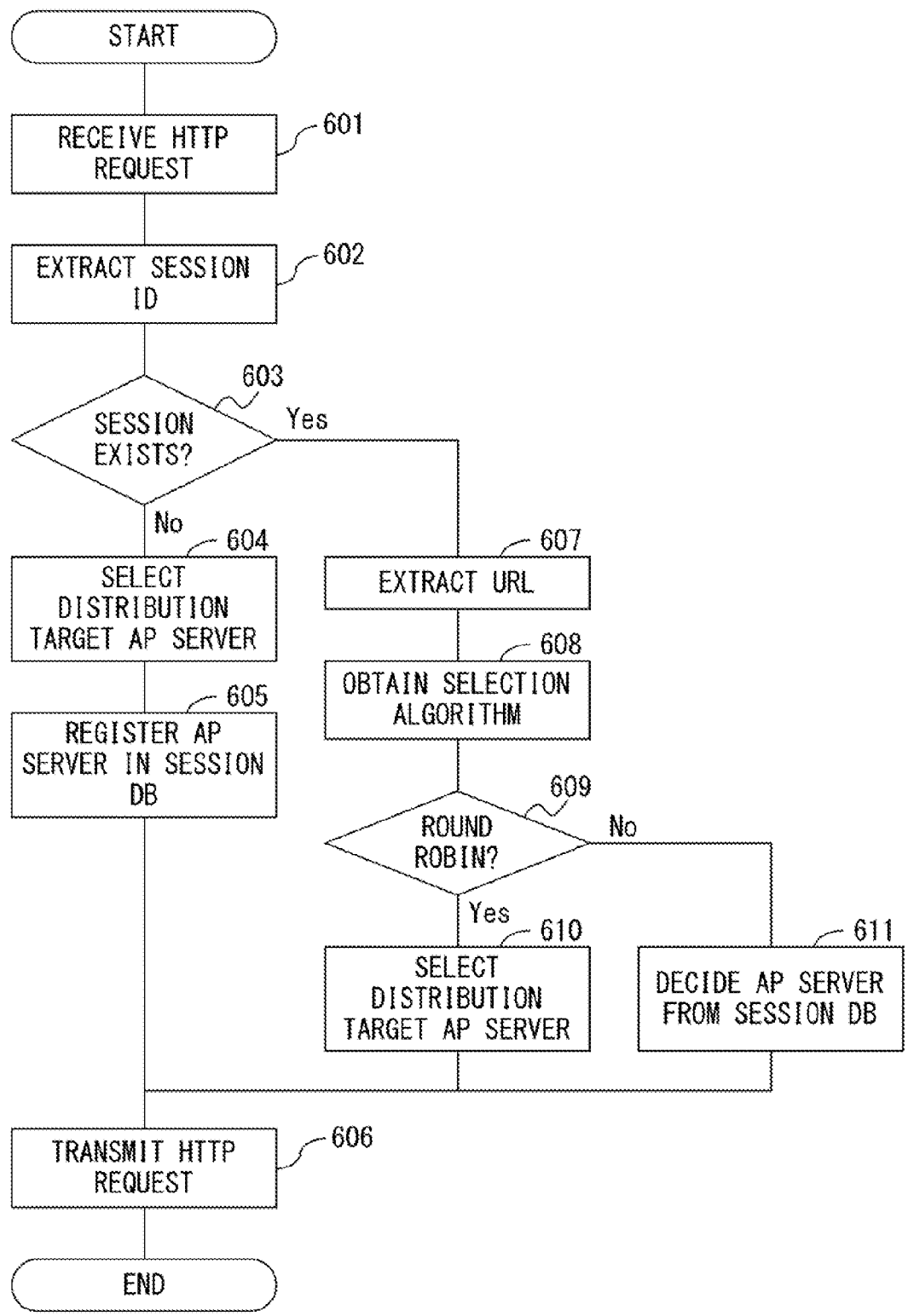
F I G. 6

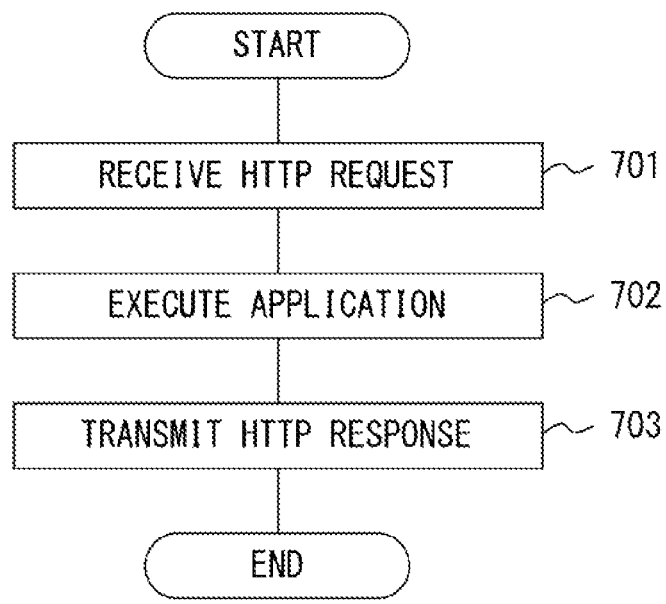
F I G. 7

| SESSION ID | INTRA-SESSION SCREEN ID | SERVER ID | HTTP REQUEST | HTTP RESPONSE |
|---|---|---|---|---|
| ahdfuikbdasi | 1 | A | GET http://hoge.com/login.do?userid=abc&password=abc_pass HTTP/1.1 | <HTML>... Welcome, abc ...<br>All items ......<br>Add to shopping cart...</HTML> |
| ahdfuikbdasi | 2 | A | GET http://hoge.com/shop/addItem.do?itemid=phone | <HTML>...Shopping cart...phone...<br>¥10,000...x1....<br></HTML> |
| ahdfuikbdasi | 2 | B | GET http://hoge.com/shop/addItem.do?itemid=phone | <HTML>...Shopping cart...phone...<br>¥10,000...x1....<br></HTML> |
| gasdigads | 1 | ... | ... | ... |

| SESSION ID | INTRA-SESSION SCREEN ID | DB REQUEST | DB RESPONSE |
|---|---|---|---|
| ahdfuikbdasi | 1 | select password from customer where userid='abc' | "abc_pass" |
| ahdfuikbdasi | 2 | select inventory_count, price from item where itemid='phone' for update | "3" |
| ahdfuikbdasi | 2 | update item set inventory_count=2 where item='phone' | OK |
| gasdigads | 1 | ... | ... |

1101, 1102, 1103

F I G. 1 1

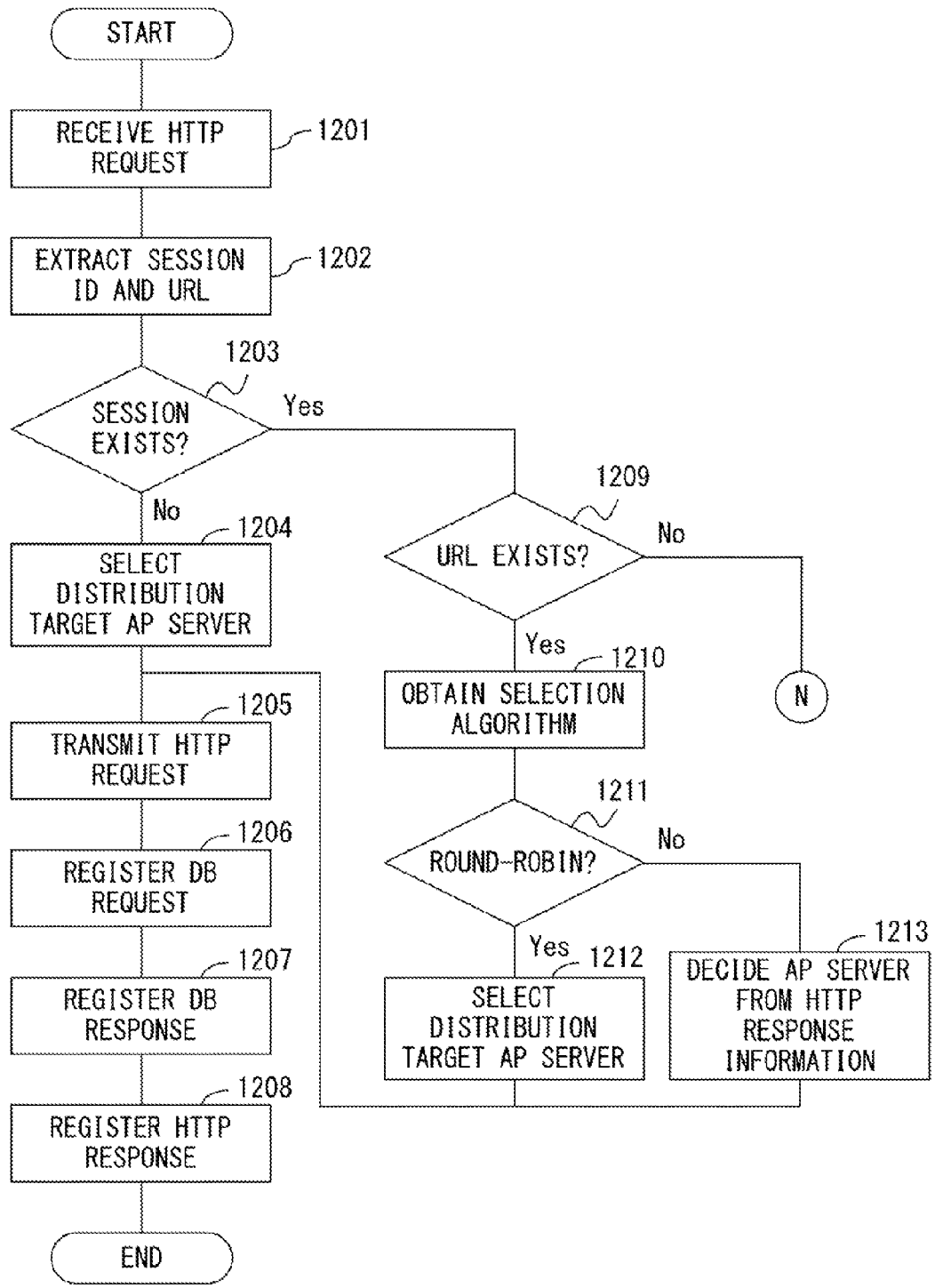
F I G. 1 2

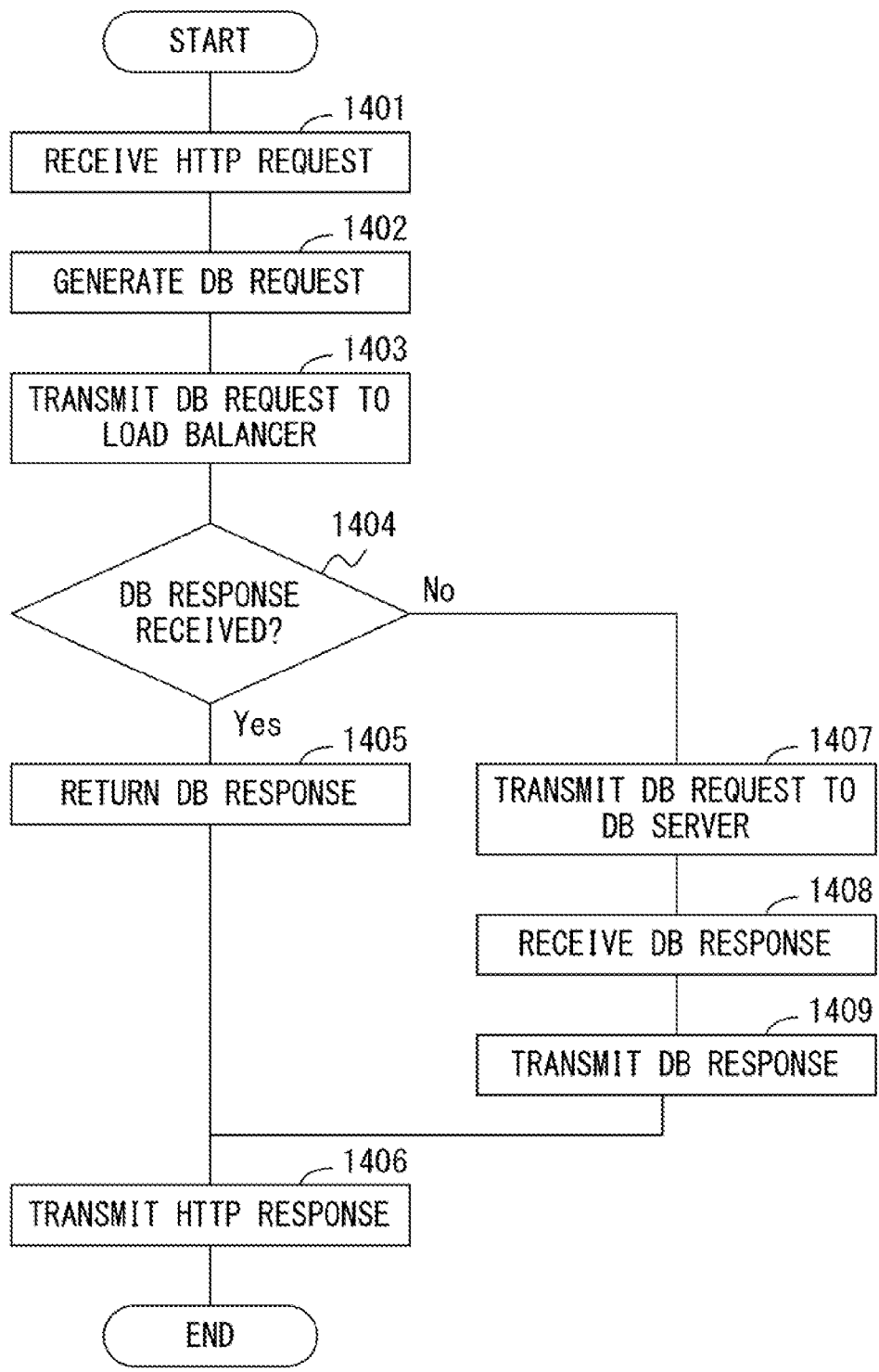
F I G. 14

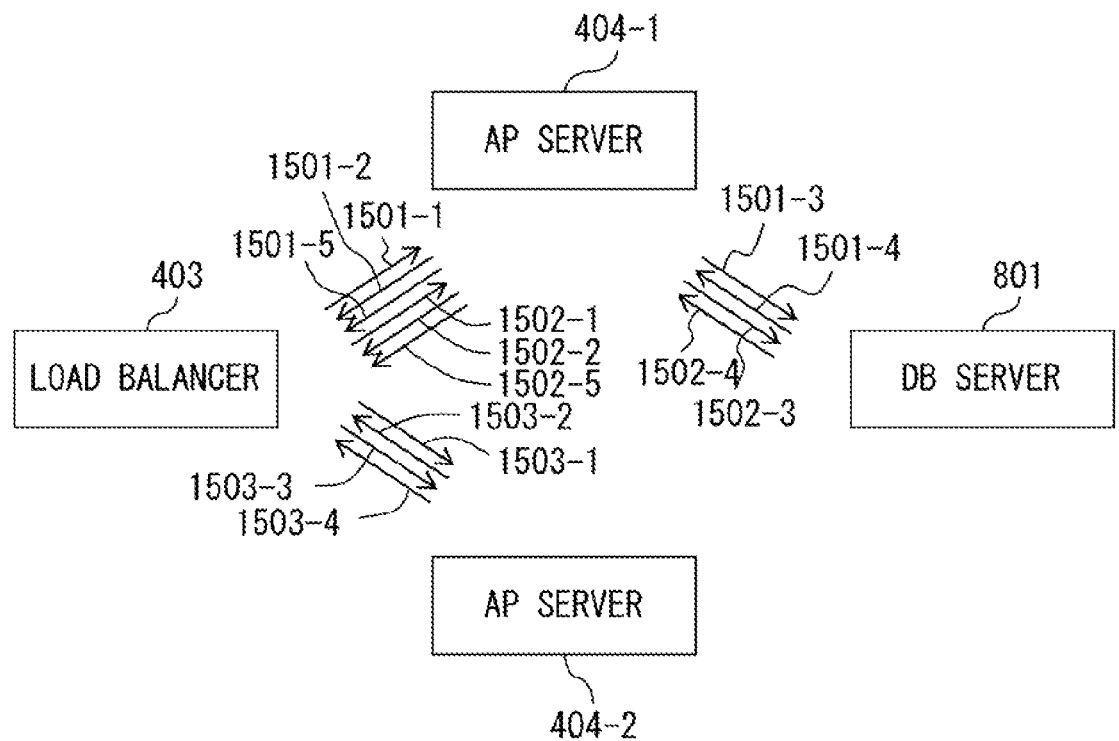
F I G. 1 5

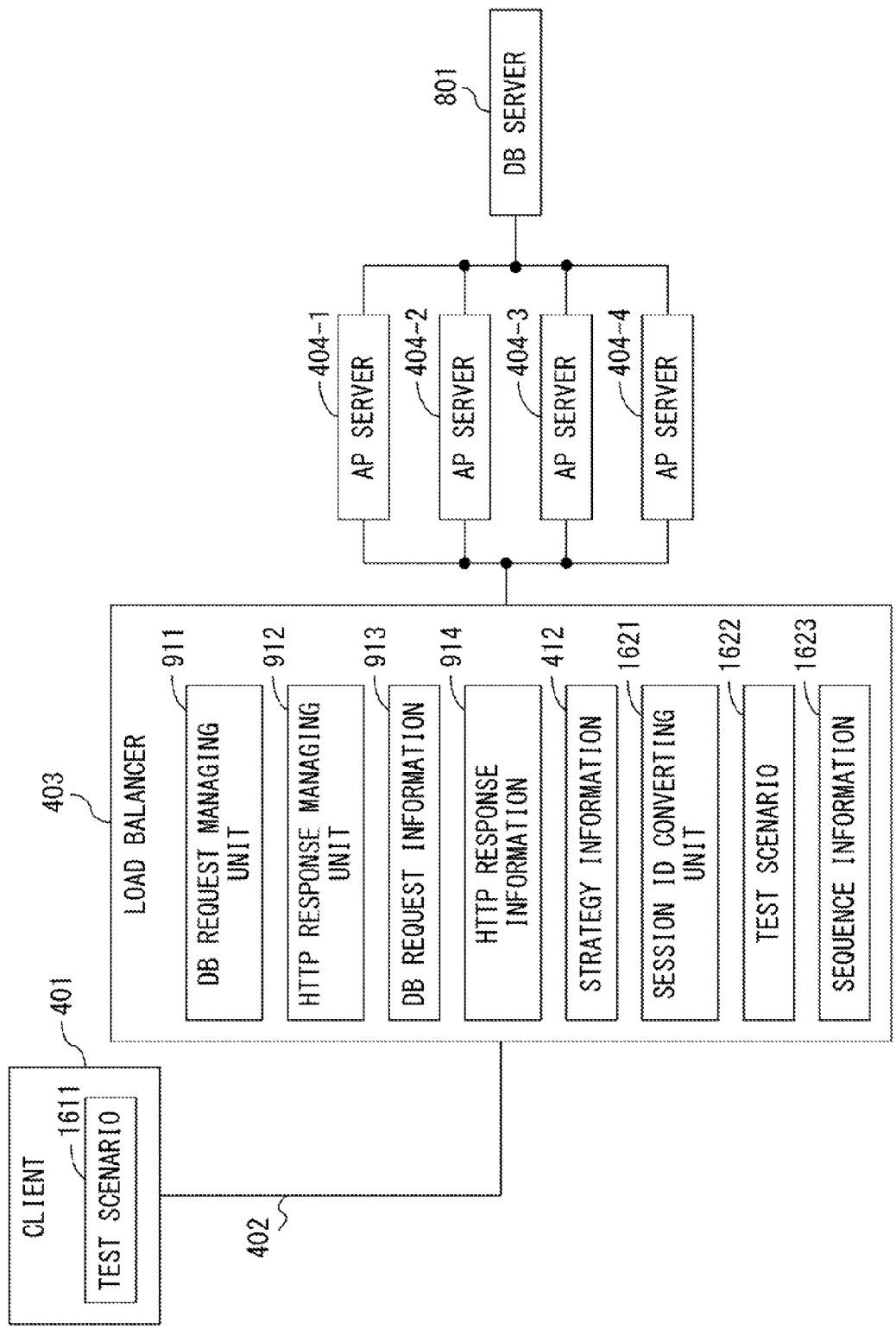

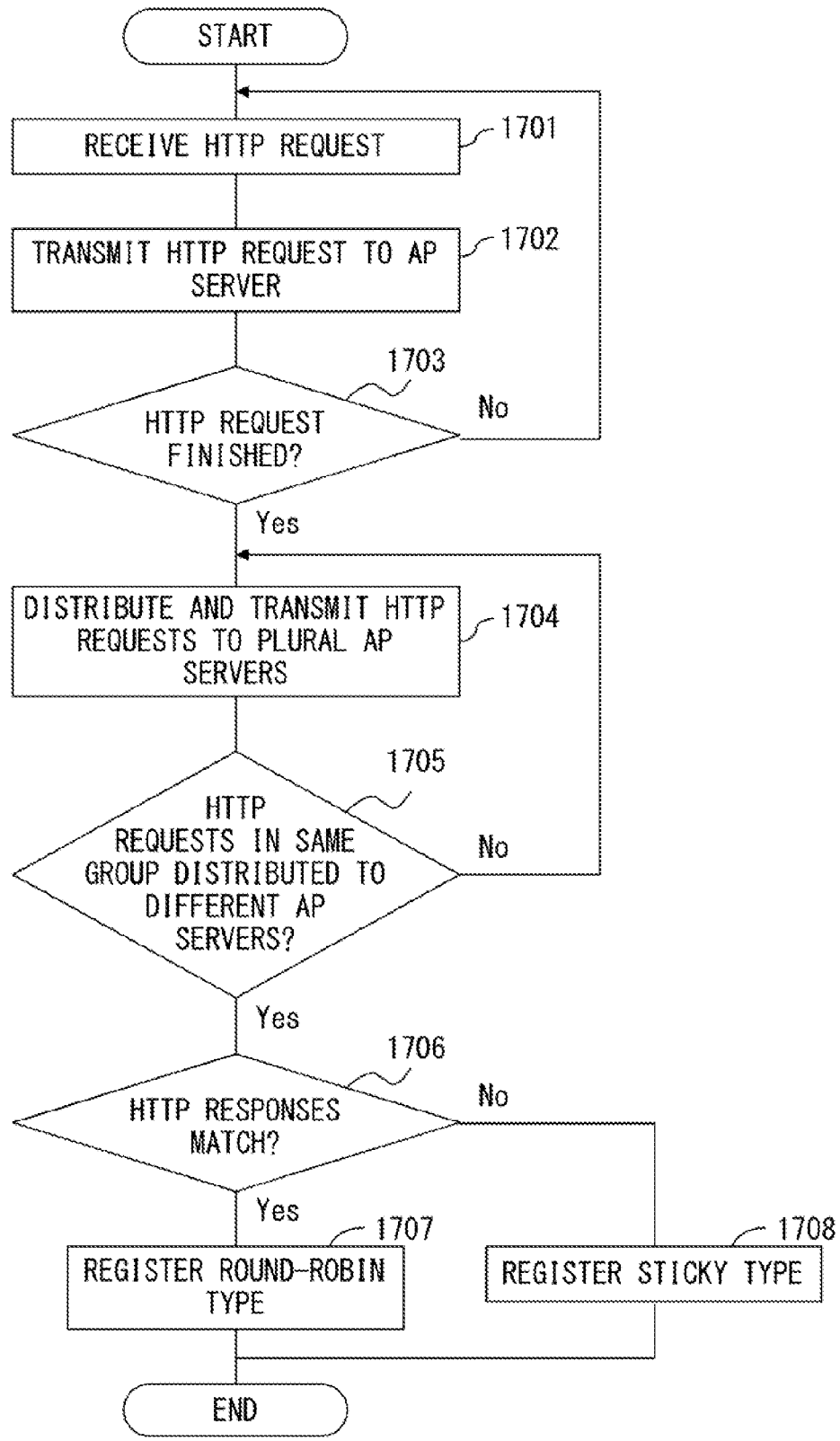
F I G. 1 7

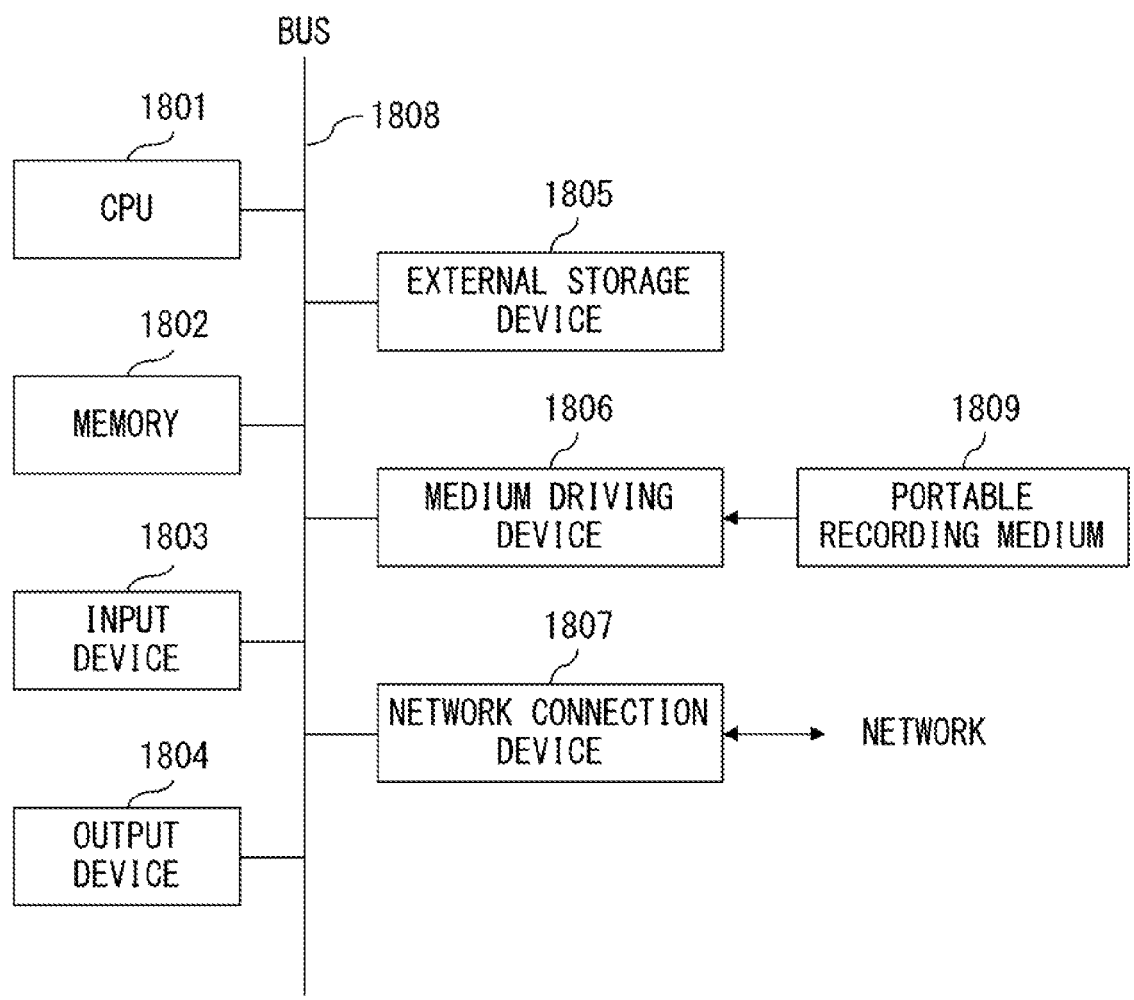
F I G. 18

US 8,694,580 B2

INFORMATION PROCESSING APPARATUS, SERVER SELECTING METHOD AND RECORDING MEDIUM

CROSS-REFERENCE TO RELATED APPLICATION

This application is based upon and claims the benefit of priority of the prior Japanese Patent Application No. 2011-147923, filed on Jul. 4, 2011, the entire contents of which are incorporated herein by reference.

FIELD

The embodiments discussed herein relate to an information processing apparatus, a server selecting method and a program to select a server to execute a process requested by a client from among a plurality of servers.

BACKGROUND

In an information processing system such as a Web system in which a plurality of servers are lined up and processing of an application program is parallelized, an information processing apparatus called a load balancer is often provided to decide the sever to execute a process requested by a client.

FIG. 1 illustrates a configuration example of such an information processing system. The information processing system in FIG. 1 includes a load balancer 103 and application (AP) servers 104-1 through 104-4. The load balancer 103 receives process requests from a client 101 via a communication network 102 such as the Internet, and distributes them into the AP servers 104-1 through 104-4 to disperse the load. Accordingly, stable service may be provided to the client 101, and the service may be provided continuously even when any of the AP servers fail.

The load balancer 103 may receive a process request not only from the client 101 but also from a plurality of clients including other client and distribute process requests into the AP servers 104-1 through 104-4. In the explanation below, an application program may be referred to simply as an application.

While there are several types of algorithms (strategies) for load dispersion used by a load balancer, popular ones are the following two types.

(1) Sticky Type

In this algorithm (strategy), a plurality of process requests from the same client are distributed into the same AP server. In this case, using the Internet Protocol (IP) address, cookie information and the like of the client as identification information, the same AP server is selected as the AP server to execute processes requested by the same client. This strategy is often used as there is a high possibility that even an existing application that is not intended for distributed processing may operate appropriately according to the strategy. Meanwhile, problems have been pointed out such as that even when the number of the AP servers becomes excessive for example, an AP server is not allowed to stop easily, and that when an AP server shuts down, all the processing of the client that was using the AP server stops.

(2) Round-Robin Type

In this algorithm (strategy), a plurality of process requests from the same or a plurality of clients are distributed into a plurality of AP servers by a specific algorithm. While this strategy has a simple mechanism, it may not operate appropriately if the application is not created for the distributed processing.

In addition, a technique to sort client requests to access a certain web site in a web farm including a plurality of websites into a sharable client request and a non-sharable client request has been known. In this technique, the sharable client request is processed by a server assigned to another website, and the non-sharable client request is processed by a server assigned to the certain website.

A technique to share session data created when an AP server selected by the load balancer executes an application, between AP servers in a system having a plurality of AP servers has also been known.

Patent document 1: Japanese Patent No. 3989443
Patent document 2: Japanese Patent No. 3537338
Patent document 3: Japanese Laid-open Patent Publication No. 2010-079523

SUMMARY

In an aspect, a program recorded on a computer-readable, non-transitory medium makes a computer perform the following processes.

(1) A process to receive a process request from a client.

(2) A process to obtain a selection algorithm corresponding to process identification information specified by the process request, from a storing unit to store correspondence relationship between process identification information indicating a requested process and a selection algorithm to select a server from among a plurality of servers, and to select a server to execute a process requested by the process request from among the plurality of servers based on the obtained selection algorithm.

(3) A process to transmit the process request to the selected server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a flowchart of a first load balancing process;
FIG. 7 is a flowchart of a first application execution process;
FIG. 10 is a diagram illustrating HyperText Transfer Protocol (HTTP) response information;
FIG. 11 is a diagram illustrating database (DB) request information;
FIG. 12 is a flowchart (part 1) of a second load balancing process.

FIG. 14 is a flowchart of a second application execution process;

FIG. 15 is a diagram illustrating the communication procedure in a third information processing system;

FIG. 16 is a configuration diagram of a fourth information processing system;

FIG. 17 is a flowchart of a test scenario execution process; and

FIG. 18 is a configuration diagram of an information processing apparatus.

DESCRIPTION OF EMBODIMENTS

As described above, in the conventional information processing system, the process requests from the client are distributed into a plurality of servers by the load balancer. However, the conventional information processing system has the following problem.

In recent years, cloud services such as Platform as a Service (Paas) has started to spread, and there are many cases of the distributing strategy of the round-robin type being adopted in the service.

Many of applications that does not operate with the round-robin type has a mechanism to keep the status of the client in a memory and a local disk of the AP server, The status of the client include information such as whether or not the client has logged in, what item is in the shopping cart of an online shopping service, and the like. In the case in which the AP server keeps the status of the client, the distributing strategy of the sticky type is desirable, and in order to adopt the distributing strategy of the round-robin type, the application needs to be modified so that parallel processing may be performed.

For example, when shifting an application from on-premises to cloud, if the distributing strategy of the sticky type is adopted for on-premises, the application does not operate appropriately without change after shifting to cloud. For this reason, modification of the application is needed, but a large scale application requires significant cost and time to modify the entire application.

Such a problem arises not only when shifting an application from on-premises to cloud but also with other cases in which the selection algorithm to select a server to execute a requested process is changed.

Preferred embodiments of the present invention will be explained with reference to accompanying drawings.

Figure 2:
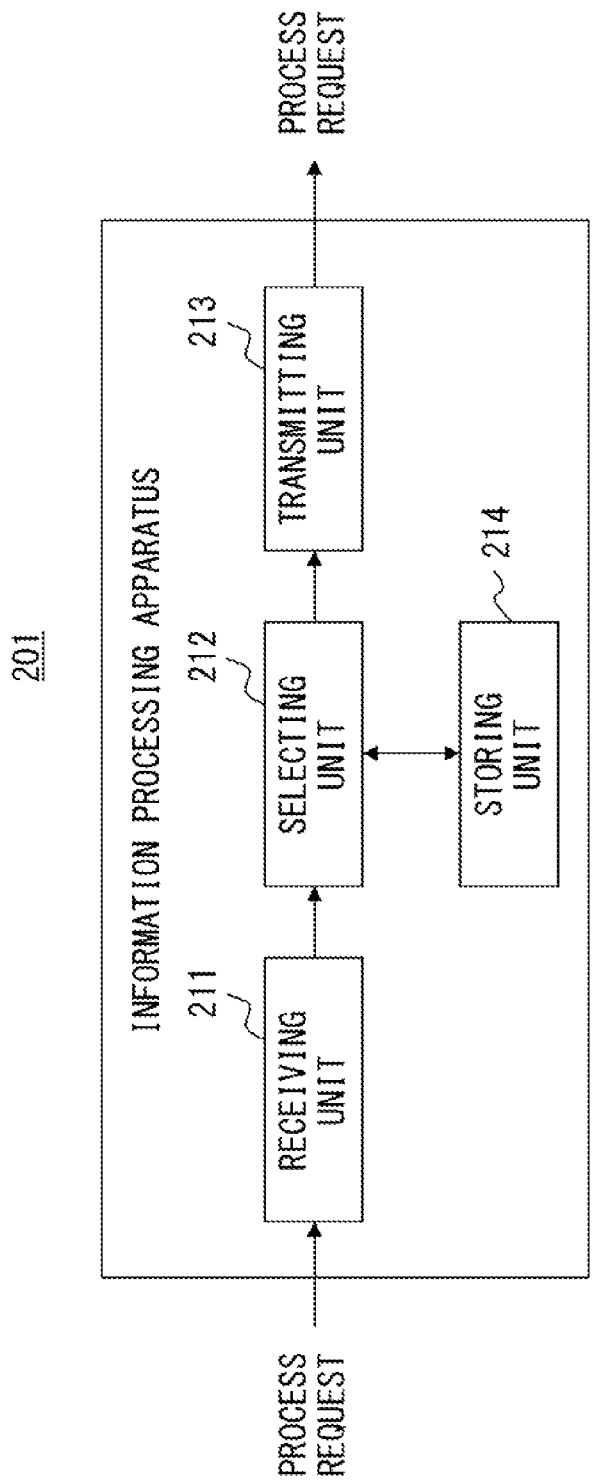
FIG. 2 is a functional configuration diagram of an information processing apparatus.

FIG. 2 illustrates a functional configuration example of an information processing apparatus of an embodiment. The information processing apparatus 201 in FIG. 2 includes a receiving unit 211, a selecting unit 212, a transmitting unit 213, and a storing unit 214, and selects a server to execute a process requested by the client from among a plurality of servers.

The storing unit 214 stores the correspondence relationship between process identification information indicating the requested process and the selection algorithm to select a server to execute a process requested by the client from among a plurality of servers. For example, for a Web system, Uniform Resource Locator (URL) included in a HyperText Transfer Protocol (HTTP) request is used as the process identification information. Meanwhile, for information processing systems other than that, a character string of the command from the client to the server and the like may be used as the process identification information. As the selection algorithm, a plurality of server selection algorithms including the sticky type and the round-robin type are used.

Figure 3:
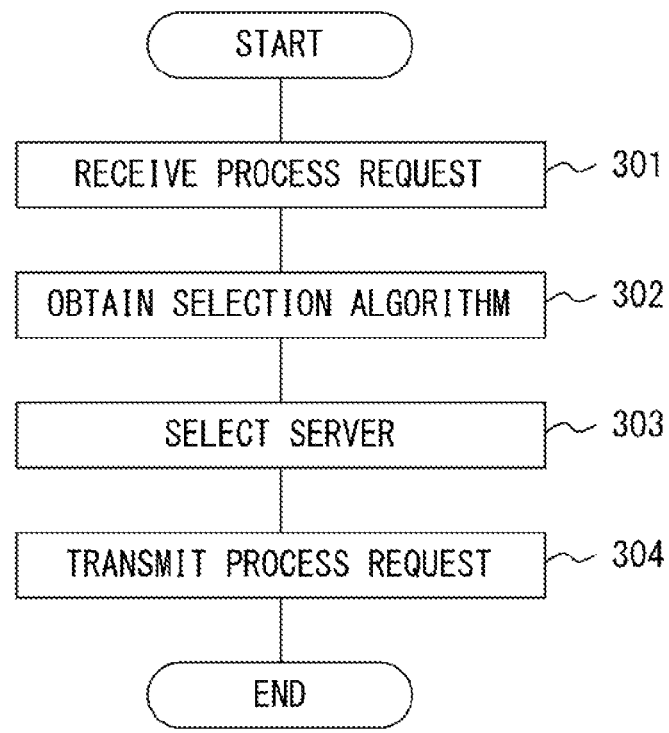
FIG. 3 is a flowchart of a server selecting process.

FIG. 3 is a flowchart of a server selecting process by the information processing apparatus in FIG. 2. First, the receiving unit 211 receives a process request from the client (step 301). The selecting unit 213 obtains the selection algorithm corresponding to the process identification information specified by the process request (step 302). Then, based on the obtained selection algorithm, a server to execute the process requested by the process request is selected from among a plurality of servers (step 303). The transmitting unit 213 transmits the process request to the selected server (step 304).

According to such an information process apparatus, the selection algorithm to select a server to process a requested process may be changed flexibly based on the type of the process.

Figure 4:
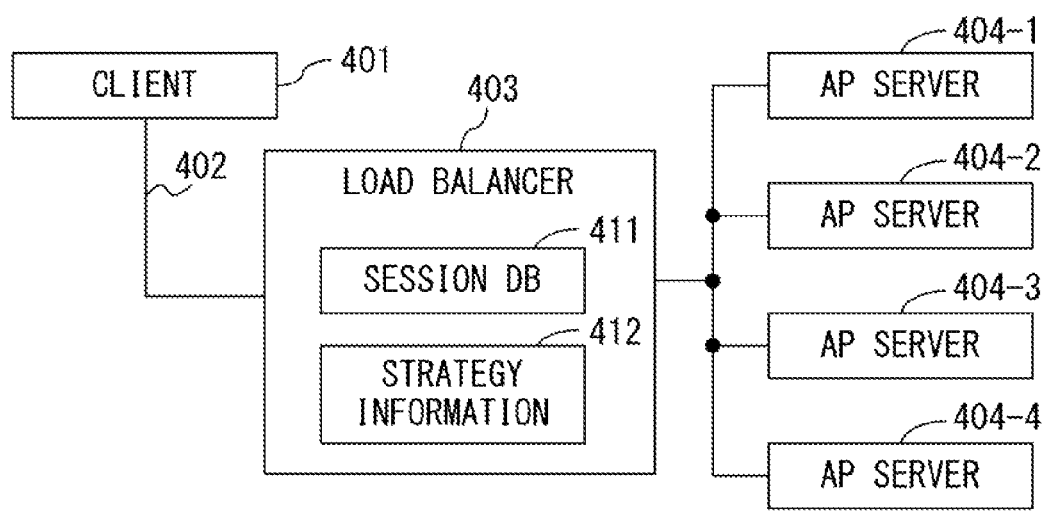
FIG. 4 is a configuration diagram of a first information processing system.

FIG. 4 illustrates a configuration example of an information processing system in which the information processing apparatus in FIG. 2 is used as the load balancer. The information processing system in FIG. 4 includes a load balancer 403 and AP servers 404-1 through 404-4.

The client 401 is an information processing apparatus such as a personal computer and a mobile terminal and the like, and accesses the load balancer 403 via a communication network 402 such as the Internet. The client 401 transmits a process request such as an HTTP request and the like to the load balancer 403.

When transmitting an HTTP request, the user of the client 401 specifies the URL of the access target by directly inputting the URL or selecting a bookmark. Accordingly, an HTTP request including the specified URL and a query is transmitted to the load balancer 403.

The load balancer 403 is an information process apparatus equipped with a server operating system (OS) suitable for parallel processing, and receives process requests from the client 401 and distribute them into the AP server 404-1 through 404-4. A plurality of server selection algorithms including the sticky type and the round-robin type are integrated into the load balancer 403, which stores a session database (DB) 411 and strategy information 412.

The session DB 411 represents correspondence relationship between identification information (session ID) identifying the session of the client 401 and identification information (server ID) of the AP server 404 that processed the HTTP request at the session start. At the session start, the session ID and the server ID are registered in the session DB 411, and at the session end, the registered information is eliminated. The strategy information 412 represents the correspondence relationship between the URL of the access target and the selection algorithm.

Figure 5:
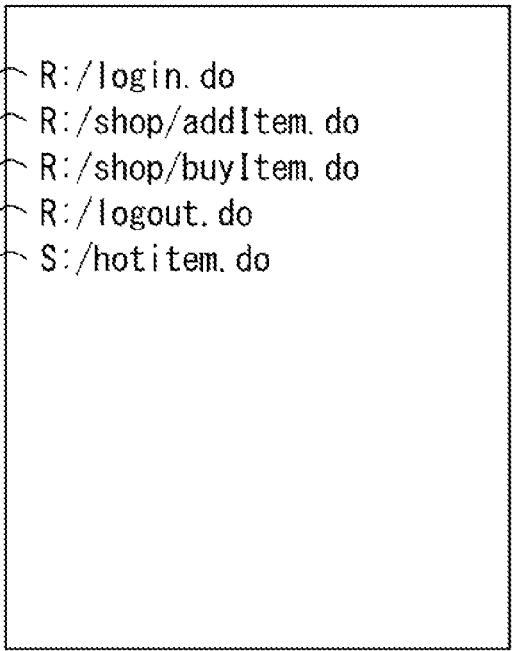
FIG. 5 is a diagram illustrating strategy information.

FIG. 5 illustrates an example of strategy information 412. In the strategy information 412 in FIG. 5, "R" in the entries 501 through 504 represents the selection algorithm of the round-robin type and "S" in the entry 505 represents the selection algorithm of the sticky type. The URL registered in the strategy information 412 does not have to be a string of all the characters of the URL of the access target, and may be its partial character string. For example, to the URL including character string "/login.do" in the entry 501, the selection algorithm of the round-robin type is associated, and to the URL including character string "/hotitem.do" in the entry 505, the selection algorithm of the sticky type is associated.

In the selection algorithm of the sticky type, a plurality of HTTP requests belonging to the same session are distributed to the same AP server 404. For example, a plurality of HTTP requests for which the same IP address and the same cookie information is used belong to the same session.

In the selection algorithm of the round-robin type, for example, an AP server is selected from among the AP servers 404-1 through 404-4 in a specific order. The specific order may be the order of the server ID, or may be the ascending order of the load. Furthermore, in the selection algorithm of the round-robin type, an AP server may be randomly selected from among the AP servers 404-1 through 404-4.

The strategy information 412 may be input by the developer of the application manually in consideration with the characteristics of the application such as whether parallel processing may by performed or not, or the strategy information 412 may be generated by the load balancer 403 itself by a specific algorithm. The load balancer 403 obtains the selection algorithm corresponding to the URL included in a process request referring to the strategy information 412, and selects a server to execute the process based on the selection algorithm.

The load balancer 403 may receive a process request not only from the client 401 but also from a plurality of clients including other client and distribute process requests to AP servers 404-1 through 404-4.

The AP server 404-1 through 404-4 are information apparatuses equipped with a server OS suitable for parallel processing, and execute an application based on the process request received from the load balancer 403.

FIG. 6 is a flowchart illustrating an example of a load balancing process by the load balancer 403 in FIG. 4 in a case in which two types of selection algorithms of the round-robin type and the sticky type are applied.

The load balancer 403 receives an HTTP request from the client 401 (step 601), and extracts the session ID such as cookie information and the like from the HTTP request (step 602). Then, the extracted session ID is checked against the latest session ID registered in the session DB 411 as to whether they match or not (step 603).

If the extracted session ID is not the latest ID (step 603, No), the distribution target AP server 404 is selected by the selection algorithm of the round-robin type (step 604). Then, the session ID and the server ID of the selected AP server 404 are associated and stored in the session DB 411 (step 605), and the HTTP request is transmitted to the AP server (step 606).

Meanwhile, if the extracted session ID is the latest session ID ((step 603, Yes), the URL is extracted from the HTTP request, and referring to the strategy information 412, the selection algorithm corresponding to the URL is obtained (step 608). Then, whether the obtained selection algorithm is either the round-robin type or the sticky type is checked (step 609).

If the selection algorithm is the round-robin type (step 609, Yes), the distribution target AP server 404 is selected by the selection algorithm of the round-robin type (step 610), and the process in step 606 is performed. On the other hand, if the selection algorithm is the sticky type (step 609, No), the server ID corresponding to the session ID is obtained from the session DB 411, and the AP server 404 indicated by the server ID is decided as the distribution target (step 611). Then, the process in step 606 is performed.

FIG. 7 is a flowchart illustrating an example of an application executing process by the AP server 404 in FIG. 4. The AP server 404 receives an HTTP request from the load balancer 403 (step 701), and executes the process requested by the HTTP request (step 702). Then, an HTTP response including the processing result is transmitted to the load balancer 403 (step 703).

According to such an information processing system, the selection algorithm of the AP server 404 may be switched for every URL of the access target. For this reason, for example, when shifting an application that has been operating based on the selection algorithm of the sticky type on premises into cloud, the application may be divided for every part corresponding to an URL, and a different algorithm may be adopted for every part. Therefore, it becomes possible to handle a large-scale application only with a partial modification, reducing the load required for the modification. For example, by dividing the application into two and modifying only one of them, the load required for the modification is reduced to half.

In addition, when operating the information processing system in a cloud environment, a platform equipped with both the existing application and a new application may be built.

Figure 8:
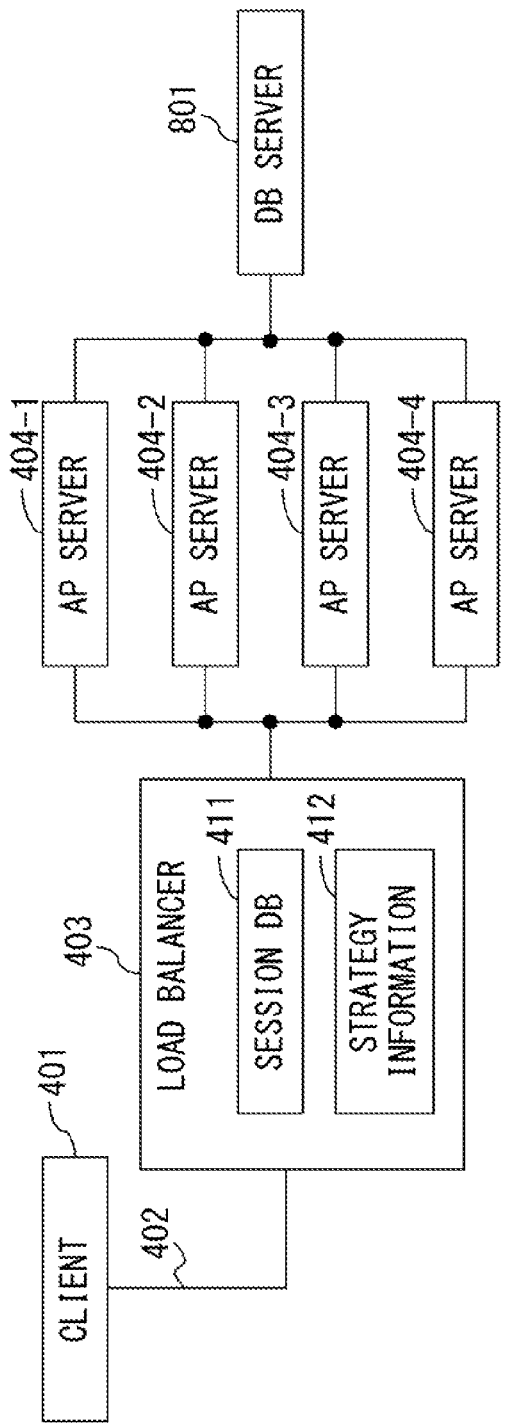
FIG. 8 is a configuration diagram of a second information processing system.

FIG. 8 illustrates another configuration example of an information processing system. The information processing system in FIG. 8 has a configuration in which a database (DB) server 801 is added to the information processing system in FIG. 4.

The AP server 404 generates a data request based on the process request received from the load balancer 403 and transmits it to the DB server 801. The DB server 801 is an information processing apparatus equipped with a server OS suitable for parallel processing, and keeps a DB such as a relational database (RDB). The DB server 801 generates a data response for the data request from the AP server 404 and transmits it back to the AP serves 404.

In such an information processing system, in the same manner as the information processing system in FIG. 4, the selection algorithm of the AP server 404 of may be switched for every URL of the access target by the load balancer 403.

While the information processing system in FIG. 4 and FIG. 8 includes four AP servers, the number of the AP servers included in the information processing system of the embodiment may be three or less, or may be five or more. For an actual information processing system, the number of AP servers is determined according to the load on the system. In a cloud environment, the number of the AP servers may be flexibly increased and reduced.

Next, with reference to FIG. 9 through FIG. 15, the configuration and operation in which the load balancer 403 generates strategy information 412 is explained.

Figure 9:
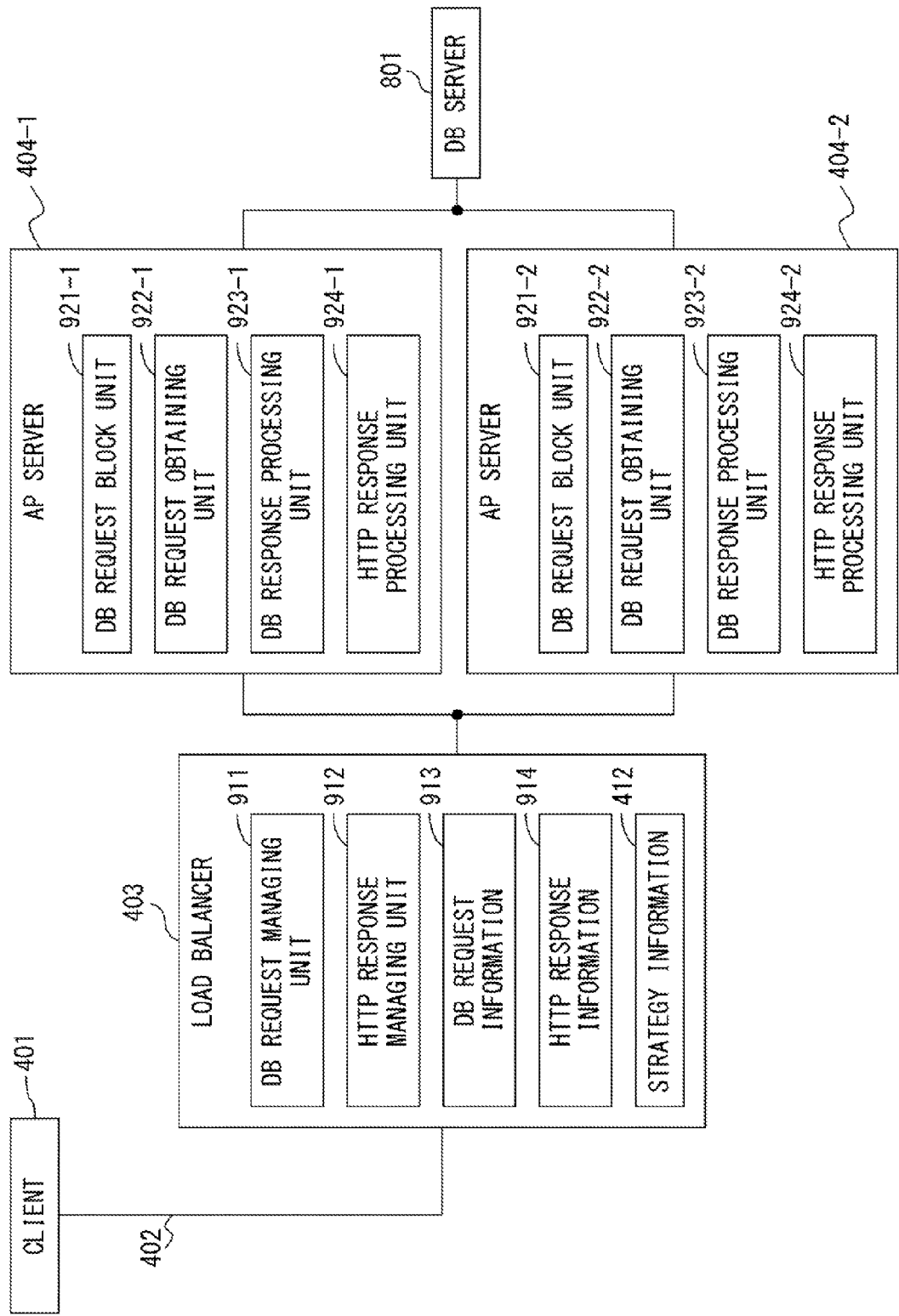
FIG. 9 is a configuration diagram of a third information processing system.

FIG. 9 illustrates a functional configuration example of the load balancer 403 and the AP servers 404-1 and 404-2 in such an information processing system. If the number of the AP servers is three or more, the same functional configuration is also used.

The load balancer 403 in FIG. 9 corresponds to the information processing apparatus in FIG. 2, and includes a DB request managing unit 911 and an HTTP response managing unit 912. The load balancer 403 generates strategy information 412 using DB request information 913 and HTTP response information 914.

The DB request managing unit 911 stores a DB request that the AP server 404 transmits to the DB server 801 and a DB response that the AP server 404 receives from the DB server 801 as the DB request information 913. A query, a data update process instruction and the like are included in the DB request.

The load balancer 403 may transmit the same HTTP request to the AP servers 404-1 and 404-2. The HTTP response managing unit 912 stores an HTTP response that is a response to the HTTP request transmitted to the AP servers 404-1 and 404-2 as the HTTP response information 914.

One or more applications are deployed in the AP server 404-*i* (i=1, 2), and a corresponding application is started based on the rule of the URL and the like. In the application, a program to transmit a DB request to the DB server 801 is described. The AP server 404-*i* includes a DB request blocking unit 921-*i*, a DB request obtaining unit 922-*i*, a DB response processing unit 923-*i*, and an HTTP response processing unit 924-*i*.

The DB request blocking unit 921-*i* discontinues the transmission of the DB request to the DB server 801 according to a specific condition. The DB request obtaining unit 922-*i* obtains the DB request transmitted to the DB server 801 and the DB response received from the DB server 801. The response processing unit 923-*i* returns a dummy DB response to the blocked DB request. The HTTP response processing unit 924-*i* generates an HTTP response from the DB response and transmits it to the load balancer 403.

FIG. 10 illustrates an example of the HTTP response information 914. In the DB request information 914 in FIG. 10, a session ID, an intra-session screen ID, a server ID, an HTTP request, and an HTTP response are registered while being associated.

If a plurality of HTTP requests are transmitted from the client 401 in a session, a plurality of screens may be displayed sequentially on the display device of the client 401 corresponding to the plurality of HTTP responses. When such a screen transition is performed, each screen is identified by the intra-session screen ID.

The server ID indicates the AP server 404 being the transmission target of the HTTP request, and the server ID of the AP servers 404-1 and 404-2 is "A" and "B", respectively. In the HTTP request, the URL of the access target is included. The HTTP response is, for example a HyperText Markup Language (HTML) file to display a response screen to the HTTP request.

FIG. 11 illustrates an example of the DB request information 913. In the DB request information 913, the session ID, the intra-session screen ID, the DB request and the DB response are registered while being associated.

In the information processing system in FIG. 9, it is desirable to generate strategy information 412 in which an appropriate selection algorithm my be applied to every URL. Therefore, when one user performs a series of operation while continuing a session, the processing result of the case in which the same AP server 404-1 executes all the processes and the processing result of the case in which the processes are executed while switching between the AP server 404-1 and 404-2 for every screen are compared. If the both processing results match, it is determined that the selection algorithm of the round-robin type may be applied.

In this case, with respect to the second HTTP request, the processing result by the AP server 404-1 and the processing request by the AP server 404-2 are compared. However, if each of the AP servers 404 respectively performs enquiry to the DB server 801, the processing result at the DB serves 801 may differ between the AP servers 404.

For example, an application that logs in with the first HTTP request and puts an item into a shopping cart and performs stock allocation with the second HTTP request is assumed. The first HTTP request is processed by the AP server 404-1.

For the second HTTP request, first, it is processed by the AP server 404-1, and the obtained HTTP response is registered in the HTTP response information 914. Next, the same HTTP request as the HTTP request that was transmitted to the AP server 404-1 is transmitted to the AP server 404-2 from the load balancer 403, and the obtained HTTP response is registered in the HTTP response information 914. Then, the two HTTP responses are compared.

However, when the AP server 404-1 processes the second HTTP response, if the stock of the DB server 801 is reduced by one and the number of the item is reduced from one to zero, the item cannot be put into the shopping cart when the AP server 404-2 performs the same process next. For this reason, the two HTTP responses that should originally match become different, and the sticky type has to be adopted even for a URL that may be processed by the round-robin type.

Then, it is preferable that with respect to one HTTP request, the enquiry to the DB server 801 is performed only once, to make the response available between the AP servers 404. In this case, the AP servers 404-1 and 404-2 do not perform the enquiry to the DB server 801 together, but the DB response to the DB request from the AP server 404-1 is saved and used as the DB response from the AP server 404-2. At this time, the DB request blocking unit 921-2 blocks the DB request from the AP server 404-2.

Figure 13:
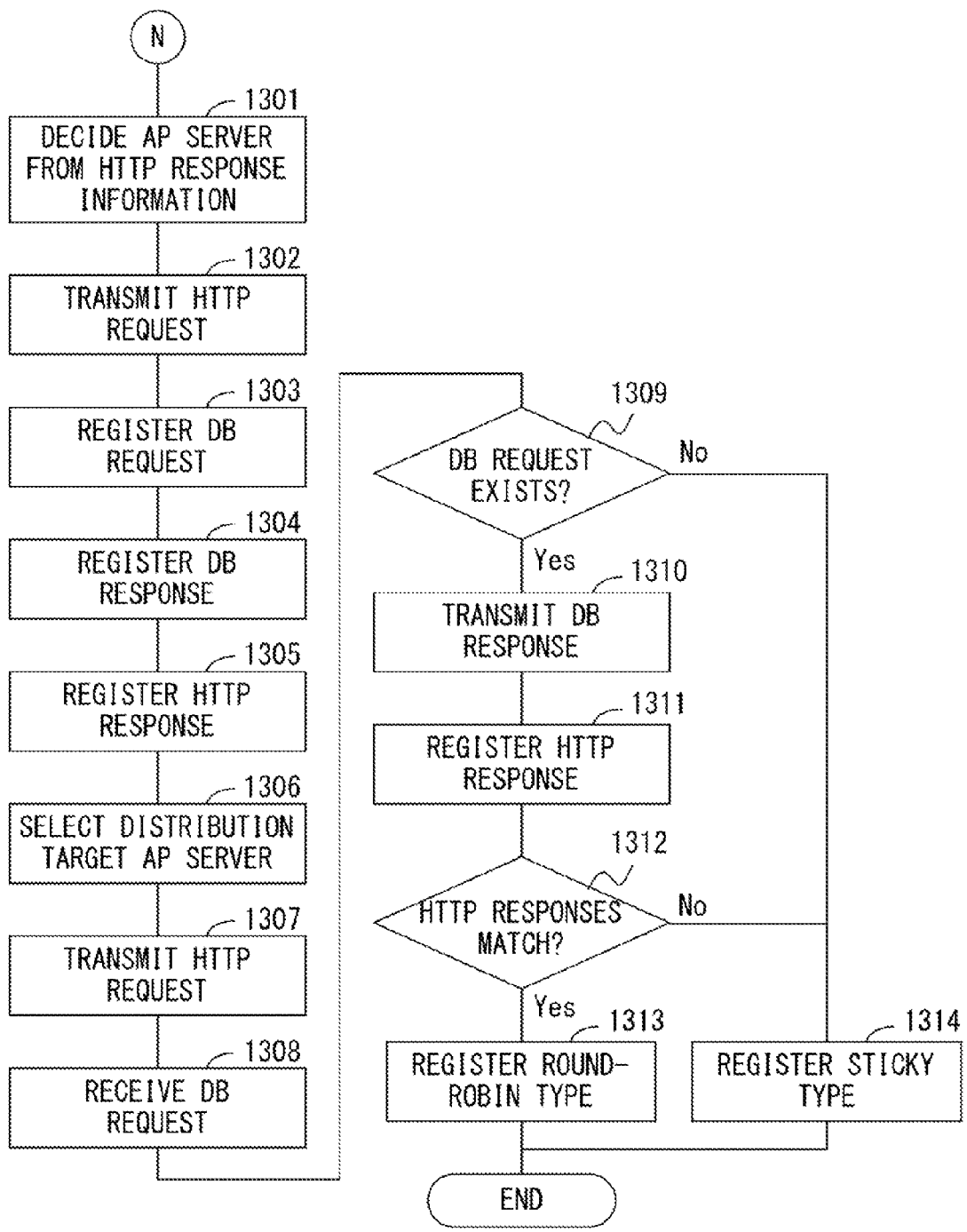
FIG. 13 is a flowchart (part 2) of a second load balancing process.

FIG. 12 and FIG. 13 are flowcharts illustrating an example the load balancing process by the load balancer 403 in FIG. 9 in a case in which two types of selection algorithm of the round-robin type and the sticky type are applied.

The load balancer 403 receives an HTTP request from the client 401 (step 1201 in FIG. 12), and extracts the session ID and the URL from the HTTP request (step 1202). Then whether or not the extracted session ID matches the latest session ID registered in the HTTP response information 914 is checked (step 1203).

If the extracted session ID is not the latest session ID (step 1203, No), the distribution target AP server 404 is selected by the selection algorithm of the round-robin type (step 1204), Then, the session ID, the intra-session screen ID, and the HTTP request are transmitted to the AP server 404 (step 1205).

At this time the HTTP response managing unit 912 associates and registers the session ID, the intra-session screen ID, the server ID of the selected AP server 404 and the HTTP request in the HTTP response information 914. In addition, the selected URL and the selection algorithm of the round-robin type are associated and registered in the strategy information 412.

Next, the load balancer 403 receives a DB request based on the transmitted HTTP request, with the session ID and the intra-session screen ID, from the distribution target AP server 404 (step 1206). At this time, the DB request managing unit 911 associates and registers the received session ID, the intra-session screen ID and the DB request in the DB request information 913.

Next, the load balancer 403 receives the DB response being a response from the DB server 801 to the DB request, with the session ID and the intra-session screen ID, from the distribution target AP server 404 (step 1207). At this time, the DB request managing unit 911 performs additional registration of the received DB response while associating it with the session ID, intra-session screen ID, and the DB request registered in the DB request information 913.

Next, the load balancer 403 receives an HTTP response to the HTTP request, with the session ID and the intra-session screen ID, from the distribution target AP server 404 (step 1208). At this time, the HTTP response managing unit 912 performs additional registration of the HTTP response while associating it with the session ID, the intra-session screen ID, the server, ID and the HTTP request registered in the HTTP response information 914.

On the other hand, if the extracted session ID is the latest session ID (step 1203, Yes), the load balancer 403 checks whether or not the extracted URL is registered in the strategy information 412 (step 1209). If the extracted URL is registered in the strategy information 412 (step 1209, Yes), the selection algorithm corresponding to the URL is obtained from the strategy information 412 (step 1210). Then, whether the obtained selection algorithm is either the round-robin type or the sticky type is checked (step 1211).

If the selection algorithm is the round-robin type (step 1211, Yes), the distribution AP server 404 is selected by the selection algorithm of the round-robin type (step 1212), and the processes in and after step 1205 are performed. On the other hand, if the selection algorithm is the sticky type (step 1211, No), the server ID corresponding to the session ID is obtained from the HTTP response information 914, and the AP server 404 indicated by the server ID is decided as the distribution target (step 1213). Then, the processes in and after 1205 are performed.

Meanwhile, if the extracted URL is not registered in the strategy information 412 (step 1209, No), the load balancer 403 selects the AP server 404 of the distribution target, based on the selection algorithm of the stick type first (step 1301). In this case, in the same manner as in step 1213, the server ID corresponding to the session ID is obtained from the HTTP response information 914, and the AP server 404 indicated by the server ID is decided as the distribution target. Then, the processes in steps 1302-1305 are performed. The processes in steps 1302-1305 are same as the processes in steps 1205-1208.

Next, the load balancer 403 selects the distribution target AP server 404 by the selection algorithm of the round-robin type (step 1306), and transmits the session ID, the intra-session screen ID, and the HTTP request to the AP server (step 1307). At this time, the HTTP response managing unit 912 associates and registers the session ID, the intra-session screen ID, the server ID of the selected AP server 404 and the HTTP request in the HTTP response information 914.

Next, the load balancer 403 receives a DB request based on the transmitted HTTP request, with the session ID and the intra-session screen ID, from the distribution target AP server 404 (step 1308).

Then, the DB request managing unit 911 checks whether the combination of the received session ID, intra-session screen ID and DB request is registered in the DB request information 913 (step 1309). If the combination is registered in the DB request information 913 (step 1309, Yes), the corresponding DB response is obtained from the DB request information 913, and transmits it to the distribution target AP server 404 (step 1310), Next, the load balancer 403 receives an HTTP response to the HTTP request, with the session ID and the intra-session screen ID, from the distribution target AP server 404 (step 1311). At this time, the HTTP response managing unit 912 performs additional registration of the received HTTP response while associating it with the session ID, the intra-session screen ID, the server ID and the HTTP request registered in the HTTP response information 914.

Next, the HTTP response managing unit 912 compares the HTTP response registered in step 1305 and the HTTP response registered in step 1311 (step 1312). Then, if the two HTTP responses match (step 1312, Yes), it is determined that the selection algorithm of the round-robin type may be applied to the URL, and the URL and the selection algorithm of the round-robin type are associated and registered in the strategy information 412 (step 1313).

On the other hand, if the two HTTP responses do not match (step 1312, No), it is determined that the selection algorithm of the round-robin type cannot be applied to the URL, and the URL and the selection algorithm of the sticky type are associated and registered in the strategy information 412 (step 1314). In addition, in a case in which the combination of the received session ID, intra-session screen ID and DB request is not registered in the DB request information 913 (step 1309, No), the process in step 1314 is performed.

FIG. 14 is a flowchart illustrating an example of the application executing process by the AP server 404 in FIG. 9. The AP server 404 receives the session ID, the intra-session screen ID, and the HTTP request from the load balancer 403 (step 1401).

The DB request blocking unit 921 generates a DB request from the received HTTP request (step 1402), and transmits it with the session ID and the intra-session screen ID to the load balancer 403 (step 1403). Then, whether or not the DB response is received from the load balancer 403 is checked (step 1404).

If the DB response is not received (step 1404, No), the DB request blocking unit 921 transmits the generated DB request to the DB server 801 (step 1407). Then, the AP server 404 receives a DB response to the DB request from the DB server 801 (step 1408).

The DB request obtaining unit 923 obtains the DB request transmitted to the DB server 801 and the DB request received from the DB server 801. Then, the DB response is returned to the application, and the DB response is transmitted to the load balancer 403 with the session ID and the intra-session screen ID (step 1409).

On the other hand, if the DB response is received from the load balancer 403 (step 1404, Yes), the DB request blocking unit 921 forwards the DB response to the DB response processing unit 923 (step 1405). Then, the DB response processing unit 923 returns forwarded DB response to the application as the DB response from the DB server 801.

Next, the HTTP response processing unit 924 generates an HTTP response from the DB response and transmits it to the load balancer 403 with the session ID and the intra-session screen ID (step 1406).

The load balancer 403 transmits the HTTP response to the client 401, and the client 401 performs rendering of the screen based on the HTML file included in the received HTTP response and displays the processing result.

Incidentally, if the application of the distribution target AP server 404 is an application that does not operate with the round-robin type, session information such as the session ID and the like is kept in the AP server 404, and a requested process is often executed based on the information.

In this case, wrong session ID and intra-session screen ID may be transmitted to the load balancer 403 in step 1403 and the judgment result in step 1309 may become No. There is also a possibility that wrong session ID and intra-session screen ID, or a wrong HTTP response may be transmitted to the load balancer 403 in step 1406, and the judgment result in step 1312 may become No. In such a case, it is determined in step 1314 that the selection algorithm of the round-robin type cannot be applied, and the selection algorithm of the sticky type is registered in the strategy information 412.

In the flowchart illustrated in FIG. 12 through FIG. 14, all the steps do not need to be executed, and it is possible to omit a part of steps based on the configuration and condition of the information processing system. For example, if an enquiry to the DB server 801 does not occur, steps 1206 and 1207 in FIG. 12, steps 1303, 1304 and 1308-1310 in FIG. 13, and steps 1402-1405 and 1407-1409 in FIG. 14 may be omitted.

Next, using the HTTP response information 914 in FIG. 10 and the DB request information 913 in FIG. 11, a specific example of the generating process of the strategy information 412 is explained. FIG. 15 illustrates the procedure of the communication performed between the load balancer 403 and the AP server 404 and the communication performed between the AP server 404 and the DB server 801 in this specific example.

Procedure 1501-1: The load balancer 403 receives the first HTTP request from the client 401 (step 1201). The session ID of the first HTTP request is not yet registered in the HTTP response information 914 in FIG. 10, and the judgment result in step 1203 becomes No. Then, the load balancer 403 transmits the received HTTP request to the AP server 404-1 (step 1205). Then, the HTTP request is registered in an entry 1001 of the HTTP response information 914 in FIG. 10, and the URL and the selection algorithm of the round-robin type are associated and registered in the entry 501 in the strategy information 412 in FIG. 5.

Procedure 1501-2: The AP server 404-1 executes an application to process the received HTTP request. Since a DB access exists in the application, the AP server 404-1 transmits a DB request to the load balancer 403 (step 1403). Then, the load balancer 403 registers the received DB request in the entry 1101 of the DB request information 913 in FIG. 11 (step 1206).

Procedure 1501-3: Since no DB response is received from the load balancer 403, the judgment result in step 1404 becomes No. Therefore, the AP server 404-1 transmits the DB request to the DB server 801 (step 1407).

Procedure 1501-4: The AP server 404-1 receives a DB response from the DB server 801 (step 1408).

Figure 1:
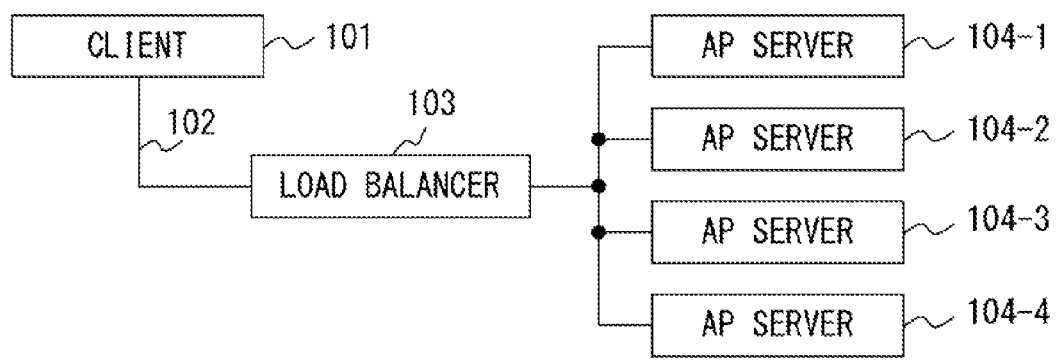
FIG. 1 is a configuration diagram of a conventional information processing system.

Procedure 1501-5: The AP server 404-1 transmits the DB response and the HTTP response to the load balancer 403 (step 1409, 1406). Then, the load balancer 403 performs additional registration of the received DB response in the entry 1101 in the DB request information 913 in FIG. 1 (step 1207). In addition, additional registration of the received HTTP response in the entry 1001 of the HTTP response information 914 in FIG. 10 is performed (step 1208).

Procedure 1502-1: The load balancer 403 receives the second HTTP request from the client 401 (step 1201), The session ID of the second HTTP request matches the session ID of the entry 1001 of the HTTP response information 914 in FIG. 10, and the judgment result in step 1203 becomes Yes. in addition, the URL of the second HTTP request is not yet registered in the strategy information 412 in FIG. 5, and the judgment result in step 1209 becomes No. Then, the load balancer 403 transmits the received HTTP request to the same AP server 404-1 as the first time (step 1302), Then, the HTTP request is registered in the entry 1002 of the HTTP response information in FIG. 10.

Procedure 1502-2: The AP server 404-1 executes an application to process the received HTTP request. Since a DB access exists in the application, the AP server 404-1 transmits a DB request to the load balancer 403 (step 1403), Then, the load balancer 403 registers the received DB request in the request information 913 in FIG. 11 (step 1303).

Incidentally, a plurality of DB requests may occur when processing one HTTP request. In this example, when processing the second HTTP request, two DB requests indicated by the entries 1102 and 1103 in FIG. 11 are generated. The DB request of the entry 1102 is a DB request to check the stock, and the DB request of the entry 1103 is a DB request to allocate the stock. In this case, the DB requests are registered in the entries 1102 and 1103 in the DB request information 913 in FIG. 11.

A transaction is often performed in the application that performs the stock allocation, and in that case, the transaction is divided and each DB request is registered in the DB request information 913.

Procedure 1502-3: Since no DB response is received from the load balancer 403, the judgment result in step 1404 becomes No. Then, the AP server 404-1 transmits two DB requests to the DB server 801 (step 1407).

Procedure 1502-4: The AP server 404-1 receives two DB responses from the DB server 801 (step 1408).

Procedure 1502-5: The AP server 404-1 transmits the two DB responses and the HTTP response to the load balancer 403 (step 1409, 1406). Then the load balancer 403 performs additional registration of the received to DB responses in the entries 1102 and 1103 of the DB request information 913 in FIG. 11 (step 1304). In addition, additional registration of the receiver HTTP response in the entry 1002 of the HTTP response information 914 in FIG. 10 is performed (step 1305).

Procedure 1503-1: Next, the load balancer 403 transmits the second HTTP request to another AP server 404-2 (step 1307). Then, the HTTP request is registered in the entry 1003 of the HTTP response information 914 in FIG. 10.

Procedure 1503-2: The AP server 404-2 executes an application to process the received HTTP request. Since two DB accesses exist in the application, the AP server 404-2 transmits two DB requests to the load balancer 403 (step 1403).

Procedure 1503-3: At this time, since the DB requests are registered in the entries 1102 and 1103 of the DB request information 913 in FIG. 11, the load balancer 403 transmits DB responses for them to the AP server 404-2 (step 1310).

Procedure 1503-4: Upon receiving the DB response from the load balancer 403, the judgment result in step 1404 becomes Yes. Then, the AP server 404-2 generates an HTTP response from the received two DB responses, and transmits them to the load balancer 403 (step 1405, 1406). In this case, the transmission of the DB request to the DB server 801 is blocked. The load balancer 403 performs additional registration of the received HTTP response in the entry 1003 of the HTTP response information 914 in FIG. 10.

At this time, since the HTTP response in the entry 1002 and the HTTP response in the entry 1003 registered in the HTTP response information 914 match, the judgment result in step 1312 becomes Yes. Then, the load balancer 403 associates and registers the URL of the second HTTP request and the selection algorithm of the round-robin type in the entry 502 of the strategy information 412 (step 1313).

After that, when another session is started from another client, if the URL of the session is registered in the strategy information 412 (step 1209, Yes), the corresponding selection algorithm may be applied. If the URL is not registered in the strategy information 412 (step 1209, No), additional registration of the URL and the selection algorithm in the strategy information 412 may be performed with the same procedure as in FIG. 15.

With the load balancer 403 generating the strategy information 412, the need for the developer of the application to input the strategy information 412 is eliminated. In particular, a large-scale application involves works to input selection algorithm for each of a number of URLs, the work efficiency improves by reducing the time for the works.

In the specific example described above, the configuration and operation in a case in which the strategy information 412 is generated for two screens in one session are explained. However, an actual application is more complicated, and the processing is often performed while switching between ten screens to several dozen screens in one session.

In such a case, by providing the same number of AP servers as the number of screens (the number of HTTP requests) and deciding a different AP server as the distribution target for every HTTP request in step 1306 in FIG. 13, the strategy information 412 may be generated in the same way. However, it seems difficult to actually provide the same number of AP servers as the number of screens, in terms of the server cost, the space for installation, power consumption and the like.

Then, when the number of screens is larger than the number of AP servers, there is a possible method to generate the strategy information 412 while repeating a test to process a plurality of HTTP requests sequentially according to a test scenario.

In this case, the load balancer 403 repeats a process to distribute a plurality of HTTP requests to a plurality of AP servers multiple times while changing the combination of HTTP request to be distributed to each AP server. Then, for each of the distributing processes, HTTP responses are received from the plurality of AP servers for all the HTTP requests. If the received HTTP responses match the HTTP response in a case in which all the HTTP requests are processed by the same AP server, the load balancer determines that the selection algorithm of the round-robin type may be applied to the URL of those HTTP requests.

FIG. 16 illustrates a functional configuration example of the load balancer 403 in such an information processing system. The load balancer 403 in FIG. 16 has a configuration in which a session ID converting unit 1621 is added to the load balancer 403 in FIG. 9, and generates the strategy information 412 using the DB request information 913, the HTTP response information 914, a test scenario 1622 and sequence information 1623.

While the information processing system in FIG. 16 includes four AP servers 404-1 through 404-4, the same functional configuration is used when the number of the AP servers is three or less, or five or more.

An application to automatically execute a test scenario 1611 is installed in the client 401. In the test scenario 1611, the sequence of the HTTP requests used in one session is registered, and the client 401 transmits those HTTP requests sequentially to the load balancer 403.

The test is performed while being divided into multiple times. In the first test, the client 401 transmits HTTP requests sequentially according to the test scenario 1611, and the load balancer 403 transmits all the received HTTP requests to the same AP server. Then, the DB request and DB response generated based on each of the HTTP requests are registered in the DB request information 913, and the HTTP request and the HTTP response are registered in the HTTP response information 914. At this time, the load balancer 403 registers the received HTTP requests in the test scenario 1622.

In the second test, the load balancer 403 distributes the HTTP requests registered in the test scenario 1622 into the AP servers 404-1 through 404-4 by the selection algorithm of the round-robin type. At this time, in order to avoid the first test and the second test being treated as the same session by the AP server 404, the session ID converting unit 1621 changes the session ID in the second and subsequent tests. For example, the session ID is changed by newly attaching cookie information to the HTTP request.

In the second test, for example, the HTTP requests are distributed to the AP server 404-1, 404-2, 404-3, 404-4, in this sequence. If the number of the HTTP requests is larger than the number of the AP servers, returning to the AP server 404-1 again, the remaining HTTP requests are sequentially distributed. At this time, the combination and the sequence of the HTTP requests processed by each AP server 404 are stored in the sequence information 1623.

For example, if ten HTTP requests R1 through R10 are included in the test scenario 1622, the first, fifth and ninth HTTP requests are transmitted to the AP server 404-1, and the second, sixth and tenth HTTP requests are transmitted to the AP server 404-2. In addition, the third and seventh HTTP requests are transmitted to the AP server 404-3, and the fourth and eighth HTTP requests are transmitted to the AP server 404-4.

Assuming the server ID of the AP servers 404-1, 404-2, 404-3 and 404-4 as "A", "B", "C" and "D", respectively, the four groups of HTTP requests are registered in the sequence information 1623 as follows.

A: R1, R5, R9
B: R2, R6, R10
C: R3, R7
D: R4, R8

If all the HTTP responses in the second test match all the HTTP responses in the first test, it may be determined that the selection algorithm of the round-robin type may be applied to the URL of all the HTTP requests included in the test scenario 1622.

However, since there is no assurance that the same HTTP responses are obtained for the HTTP requests processed by the same AP server 404 when they are respectively processed by different AP servers 404, it is desirable to performed third and subsequent tests.

In the third test, the HTTP requests are distributed so that the HTTP requests included in the same group among the HTTP requests registered in the sequence information 1623 are respectively transmitted to different AP servers 404.

In this case, R1, R5 and R9 are respectively transmitted to different AP servers 404. In addition, R3 and R7 are respectively transmitted to different AP servers 404, and R4 and R8 are respectively transmitted to different AP servers 404. Then, for example, the HTTP requests may be distributed as follows.

A: R1, R2, R3, R4
B: R5, R6, R7, R8
C: R9, R10

If all the HTTP responses in the second and third tests match all the HTTP responses in the first test, it may be determined that the selection algorithm of the round-robin type may be applied to all the URLs.

By sequentially applying such a rule to the third and subsequent tests, as long as the number of the HTTP requests is 16 or less, the sufficient combination may be realized with the number of tests being three or less. If the fourth test if performed further, the sufficient combination may be realized up to 64 HTTP requests.

If all the HTTP responses in each of the second and subsequent HTTP responses match all the responses in the first test, the load balancer 403 associates all the URLs and the selection algorithm of the round-robin type and registers them in the strategy information 412. On the other hand, any of the HTTP responses in any of the tests does not match a HTTP response in the first test, all the URLs and the selection algorithm of the sticky type are associated and registered in the strategy information 412.

FIG. 17 is a flowchart illustrating an example of a test scenario executing process by the load balancer 403 in FIG. 16 in a case in which two types of selection algorithm of the round-robin type and the sticky type are applied. While the processes related to the DB request, DB response and HTTP response are omitted in the flowchart in FIG. 17, those processes are same as in FIG. 12 and FIG. 13.

The load balancer 403 receives an HTTP request from the client 401, and registers the HTTP request in the test scenario 1622 (step 1701). Then, the distribution target AP server 404 is selected by the selection algorithm of the round-robin type, and transmits the HTTP request to the AP server 404 (step 1702).

Next, whether or not the last HTTP request included in the test scenario 1611 has been received is checked (step 1703), and if it has not been received (step 1703, No), the processes in steps 1701 and 1702 are repeated. Accordingly, all the HTTP requests included in the test scenario 1611 are transmitted to the same AP server 404, and an HTTP response to each of the HTTP requests is received from the AP server 404.

Upon receiving the last HTTP request (step 1703, Yes), the load balancer 403 performs the test based on the selection algorithm of the round-robin type. In this test, the HTTP requests registered in the test scenario 1622 are distributed and transmitted to the AP servers 404-1 through 404-4, and an HTTP response to each of the HTTP requests is received from the AP servers 404-1 through 404-4.

next, the load balancer 403 checks whether or not the HTTP requests in the same group distributed to each of the AP servers have already been distributed to different AP servers 404 respectively (step 1705). If the HTTP requests in the same group have not distributed to different AP servers yet (step 1705, No), the test in step 1704 is repeated. In the repeated test, the combination of the HTTP requests to be distributed to each of the AP servers is changed so that the HTTP requests of the same group are distributed to different AP servers 404.

If the HTTP requests of the same group in each of the tests have already been distributed to different AP servers respectively (step 1705, Yes), the HTTP responses received in each of the tests are checked (step 1706). At this time, all the HTTP responses in each of the tests are compared with all the HTTP responses received in steps 1701-1703.

Then, if the HTTP responses in each of the tests match all the HTTP responses received in steps 1701-1703, all the URLs and the selection algorithm of the round-robin type are associated and registered in the strategy information 412 (step 1701). On the other hand, if any of the HTTP responses in any of the tests does not match a HTTP response received in steps 1701-1703, all the URLs and the selection algorithm of the round-robin type are associated and registered in the strategy information 412 (step 1708).

According to the information processing system in FIG. 16, even when the number of the HTTP requests is larger than the number of the AP servers, whether or not the selection algorithm of the round-robin type may be applied may be determined with the most efficient number of times of tests.

If the number of HTTP requests equal to or smaller than the number of the AP servers, all the HTTP requests may be respectively distributed to different AP servers 404 by performing the test in step 1704 only once. In this case, the judgment result in step 1705 becomes Yes, and the processes after step 1706 are performed immediately.

If a command is used instead of an HTTP request in the embodiment in FIG. 2-FIG. 16, a character string of a command is used instead of the URL in strategy information 412, and a response to a command is used instead of the HTTP response.

The information processing apparatus 201 in FIG. 2 and the client 401, load balancer 403, AP server 404 and DB server 801 in FIG. 4, FIG. 8, FIG. 9 and FIG. 16 may be realized using an information processing apparatus (computer) such as the one illustrated in FIG. 18.

The information processing apparatus in FIG. 18 includes a Central Processing Unit (CPU) 1801, a memory 1802, an input device 1803, an output device 1804, an external storage device 1805, a medium driving device 1806 and a network connection device 1807. These are connected to each other by a bus 1808.

The memory 1802 is for example a semiconductor memory such as a Read Only Memory (ROM), a Random Access Memory (RAM), a flash memory and the like, and stores a program and data used for processing. For example, the CPU 1801 (processor) performs the processing of the client 401, load balancer 403, AP server 404 or DB server 801 by executing a program using the memory 1802. The memory 1802 may also be used as the storing unit 214 in FIG. 2, and may also store the session DB 411, strategy information 412, DB request information 913, HTTP response information 914, test scenario 1611, 1622 and sequence information 1623.

The input device 1803 is for example a keyboard, a pointing device and the like, and is used for inputting an instruction and information from the user or the operator. The output device 1804 is for example a display device, a printer, a speaker and the like, and is used for outputting an enquiry to the user or the operator and processing results. The processing results of the client 401 include a screen subjected to rendering based on an HTTP response.

The external storage device 1805 is for example a magnetic disk device, an optical disk device, a magneto-optical disk device, a tape device and the like. A hard disk drive is also included in the external storage device 1805. The information processing apparatus may store a program and data in the external storage device 1805, and may load and use them onto the memory 1802.

The medium driving device 1806 drives a portable recording medium 1809, and accesses its recorded contents. The portable recording medium 1809 also includes a Compact Disk Read Only Memory (CD-ROM), a Digital Versatile Disk (DVD), a Universal Serial Bus (USB) memory.

Thus, a computer-readable recording medium that sores a program and data used for various processing includes a physical (non-transitory) recording medium such as the memory 1802, the external storage device 1805 and the portable recording medium 1809.

The network connection device 1807 is connected to a communication network such as a Local Area Network (LAN), the Internet and the like and performs data conversion involved with the communication. The information processing apparatus may receive a program and data from an external device via the network connection device 1807, and may load and use them onto the memory 1802.

The information processing apparatus does not have to include all the constituent elements in FIG. 18, and a part of constituent elements may be omitted based on usage and conditions. For example, when the information processing apparatus is used as the load balancer 403, AP server 404, or DB server 801, the input device 1803 and the output device 1804 may be omitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a receiving unit configured to receive a first process request from a client;
a memory configured to store a correspondence relationship between process identification information indicating a requested process and one of a first selection algorithm to select a single server as a server to execute a plurality of processes requested by a single client based on identification information of the client or a second selection algorithm to select a server from among a plurality of servers by a round-robin system;
a processor configured to obtain a selection algorithm corresponding to process identification information specified by the first process request from the memory, and to select a server to execute a process requested by the first process request from among the plurality of servers based on the obtained selection algorithm; and
a transmitting unit configured to transmit the first process request to the selected server,
wherein when registering the correspondence relationship in the memory:
the transmitting unit transmits a second process request received from the client to a first server selected by the first selection algorithm and to a second server selected by the second selection algorithm;
the receiving unit receives a first processing result and a second processing result for the second process request respectively from the first server and the second server; and
the processor associates and registers in the memory, process identification information indicating a process requested by the second process request and the second selection algorithm when the first processing result and the second processing result match.

2. A server selecting method comprising:
receiving a first process request from a client;
obtaining a selection algorithm corresponding to process identification information specified by the first process request, from a memory to store a correspondence relationship between process identification information indicating a requested process and one of a first selection algorithm to select a single server as a server to execute a plurality of processes requested by a single client based on identification information of the client or a second selection algorithm to select a server from among a plurality of servers by a round-robin system;
selecting a server to execute a process requested by the first process request from among the plurality of servers based on the obtained selection algorithm; and
transmitting the first process request to the selected server,
wherein when registering the correspondence relationship in the memory, the server selecting method performs:
transmitting a second process request received from the client to a first server selected by the first selection algorithm and to a second server selected by the second selection algorithm;
receiving a first processing result and a second processing result for the second process request respectively from the first server and the second server; and
associating and registering in the memory, process identification information indicating a process requested by the second process request and the second selection algorithm when the first processing result and the second processing result match.

3. A non-transitory computer-readable medium storing therein a server selecting program that causes a computer to execute a process comprising:
receiving a first process request from a client;
obtaining a selection algorithm corresponding to process identification information specified by the first process request, from a memory to store a correspondence relationship between process identification information indicating a requested process and one of a first selection algorithm to select a single server as a server to execute a plurality of processes requested by a single client based on identification information of the client or a second selection algorithm to select a server from among a plurality of servers by a round-robin system;
selecting a server to execute a process requested by the first process request from among the plurality of servers based on the obtained selection algorithm; and
transmitting the first process request to the selected server,
wherein when registering the correspondence relationship in the memory, the server selecting program causes the computer to execute a process comprising:
transmitting a second process request received from the client to a first server selected by the first selection algorithm and to a second server selected by the second selection algorithm;
receiving a first processing result and a second processing result for the second process request respectively from the first server and the second server; and
associating and registering in the memory, process identification information indicating a process requested by the second process request and the second selection algorithm when the first processing result and the second processing result match.

4. The medium according to claim 3, wherein
the associating and registering the correspondence relationship receives, when a data request to a database occurs based on the second process request received from the client, the first processing result including a data response that the first server received from the database by transmitting the data request to the database from the first server, transmits the data response to the second server, and receives the second processing result including the data response from the second server.

5. A non-transitory computer-readable medium storing therein a server selecting program that causes a computer to execute a process comprising:
receiving a process request from a client;
obtaining a selection algorithm corresponding to process identification information specified by the process request, from a memory to store a correspondence relationship between process identification information indicating a requested process and one of a first selection algorithm to select a single server as a server to execute a plurality of processes requested by a single client based on identification information of the client or a second selection algorithm to select a server from among a plurality of servers by a round-robin system;
selecting a server to execute a process requested by the process request from among the plurality of servers based on the obtained selection algorithm; and
transmitting the process request to the selected server,
wherein when registering the correspondence relation relationship in the memory, the server selecting program causes the computer to execute a process comprising:

transmitting a plurality of process requests received from the client in one session to a first server selected by the first selection algorithm from among the plurality of servers;

receiving a plurality of first processing results for the plurality of process requests from the first server;

distributing and transmitting the plurality of process requests to the plurality of servers;

receiving a plurality of second process requests for the plurality of process requests from the plurality of servers; and associating and registering in the memory, process identification information indicating a process requested by each of the plurality of process requests and the second selection algorithm when the plurality of first processing results and the plurality of second processing results match.

6. The medium according to claim 5, wherein the associating and registering the correspondence relationship repeats a process to distribute and transmit the plurality of process requests to the plurality of servers multiple times when a number of the plurality of process requests is larger than a number of the plurality of servers, receives a plurality of second processing results for the plurality of processing requests for each of the multiple times from the plurality of servers, and associates and registers in the memory, process identification information indicating a process requested by each of the plurality of process requests and the second selection algorithm when the plurality of first processing results and the plurality of second processing results received for each of the multiple times match.

* * * * *